United States Patent [19]

Ballard

[11] 3,973,445

[45] Aug. 10, 1976

[54] CONVERSION MECHANISM FOR LINEAR TO ROTARY MOTION

[76] Inventor: Hyde Whitcomb Ballard, Barto, Pa. 19504

[22] Filed: Oct. 1, 1974

[21] Appl. No.: 511,070

[52] U.S. Cl. ............................. 74/89.21; 91/275; 92/137; 74/89.22; 74/89.2
[51] Int. Cl.² ........................................ F16H 27/02
[58] Field of Search ................. 92/137; 91/275; 74/89.21, 125.5, 34, 89.2, 89.22, 126, 812

[56] References Cited
UNITED STATES PATENTS

| | | | |
|---|---|---|---|
| 2,406,173 | 8/1946 | Stephens | 92/137 |
| 2,706,913 | 4/1955 | Trossi | 74/89.2 |
| 2,764,894 | 10/1956 | Faxen | 74/89.2 |
| 2,826,923 | 3/1958 | Sibley | 74/89.21 |
| 2,914,955 | 12/1959 | Colborne et al. | 74/89.22 |
| 2,953,928 | 9/1960 | Anderson et al. | 74/89.22 |
| 3,326,087 | 6/1967 | Gohlke et al. | 91/275 |
| 3,666,063 | 5/1972 | Schoeman et al. | 74/126 |
| 3,709,105 | 1/1973 | Ridley | 92/137 |
| 3,847,371 | 11/1974 | Norton et al. | 91/275 |
| 3,850,043 | 11/1974 | Tarbox | 74/89.21 |

Primary Examiner—John J. Camby
Assistant Examiner—Henry C. Yuen

[57] ABSTRACT

This invention relates to mechanism for converting linear motion to rotary motion without the use of a crank or crankshaft. Two circular members which may be provided with teeth are driven simultaneously in opposite directions by a chain, belt or rack which is in turn connected to a piston reciprocating in a linear path. The invention is particularly adapted to vapor engines sometimes referred to as expanders. It also comprises both electrically and mechanically actuated valve motions, including a reverse means and means for varying cut-off.

10 Claims, 13 Drawing Figures

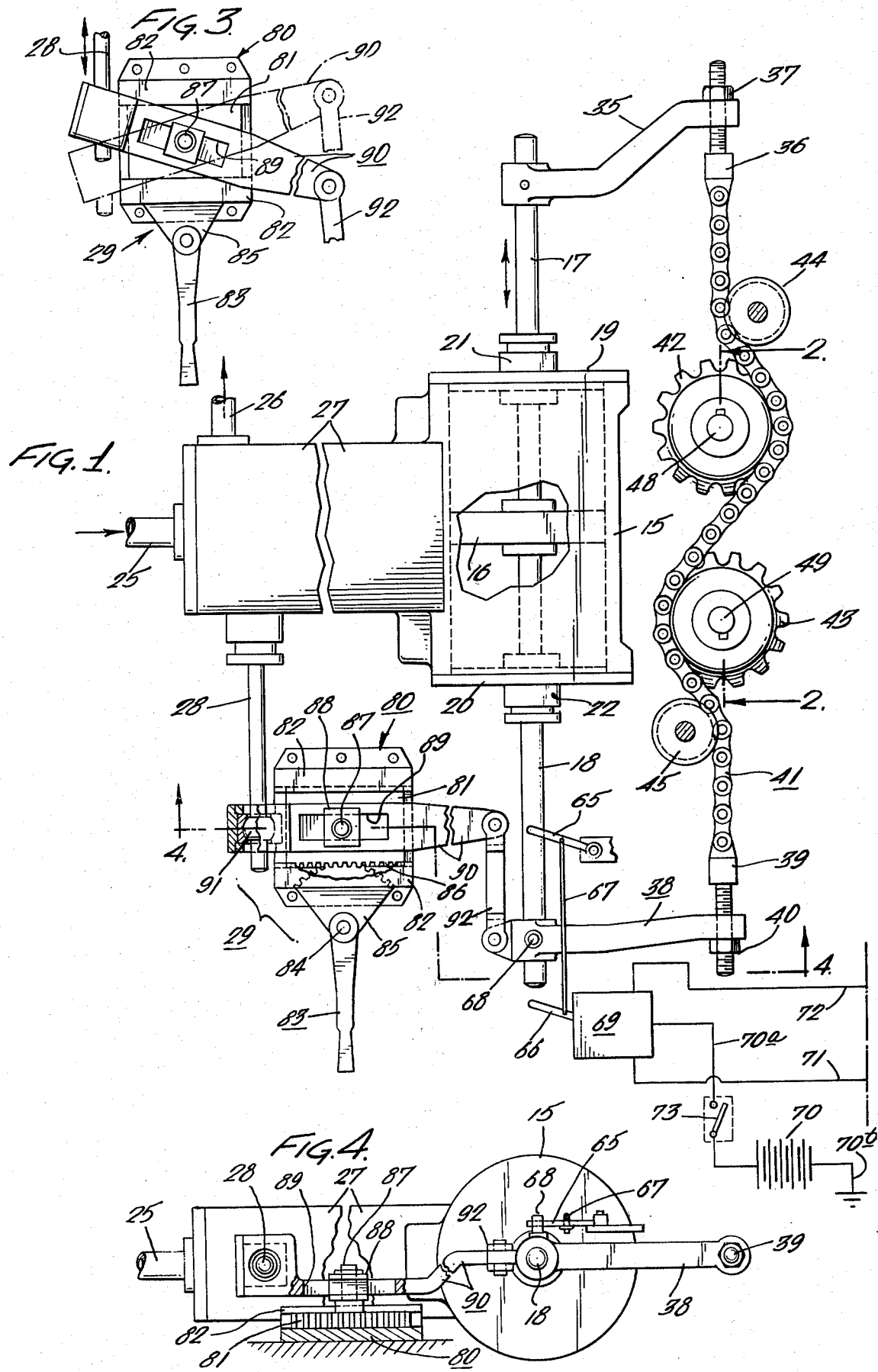

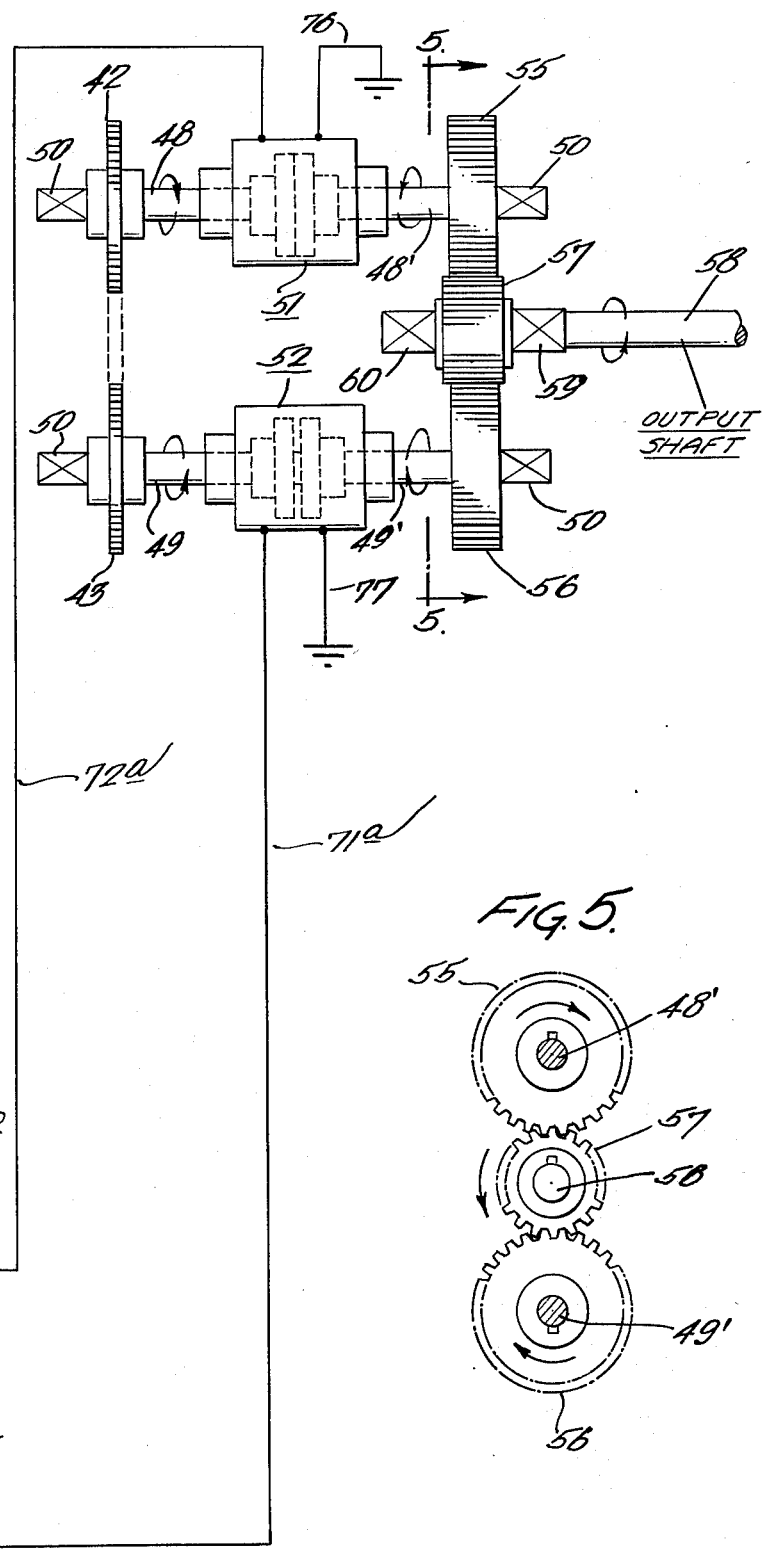
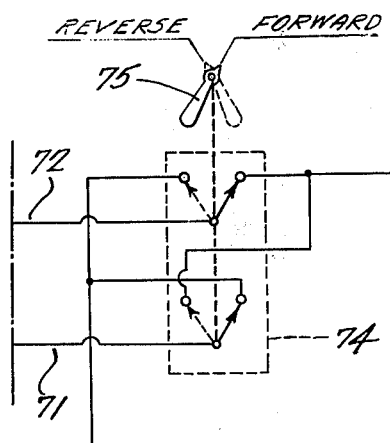
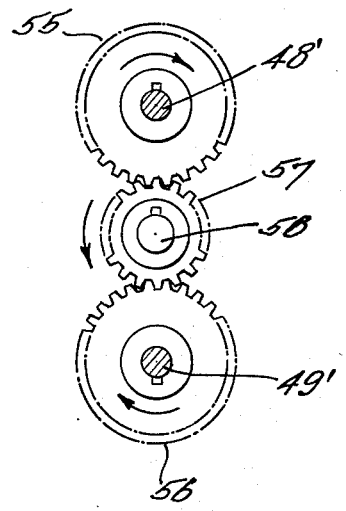

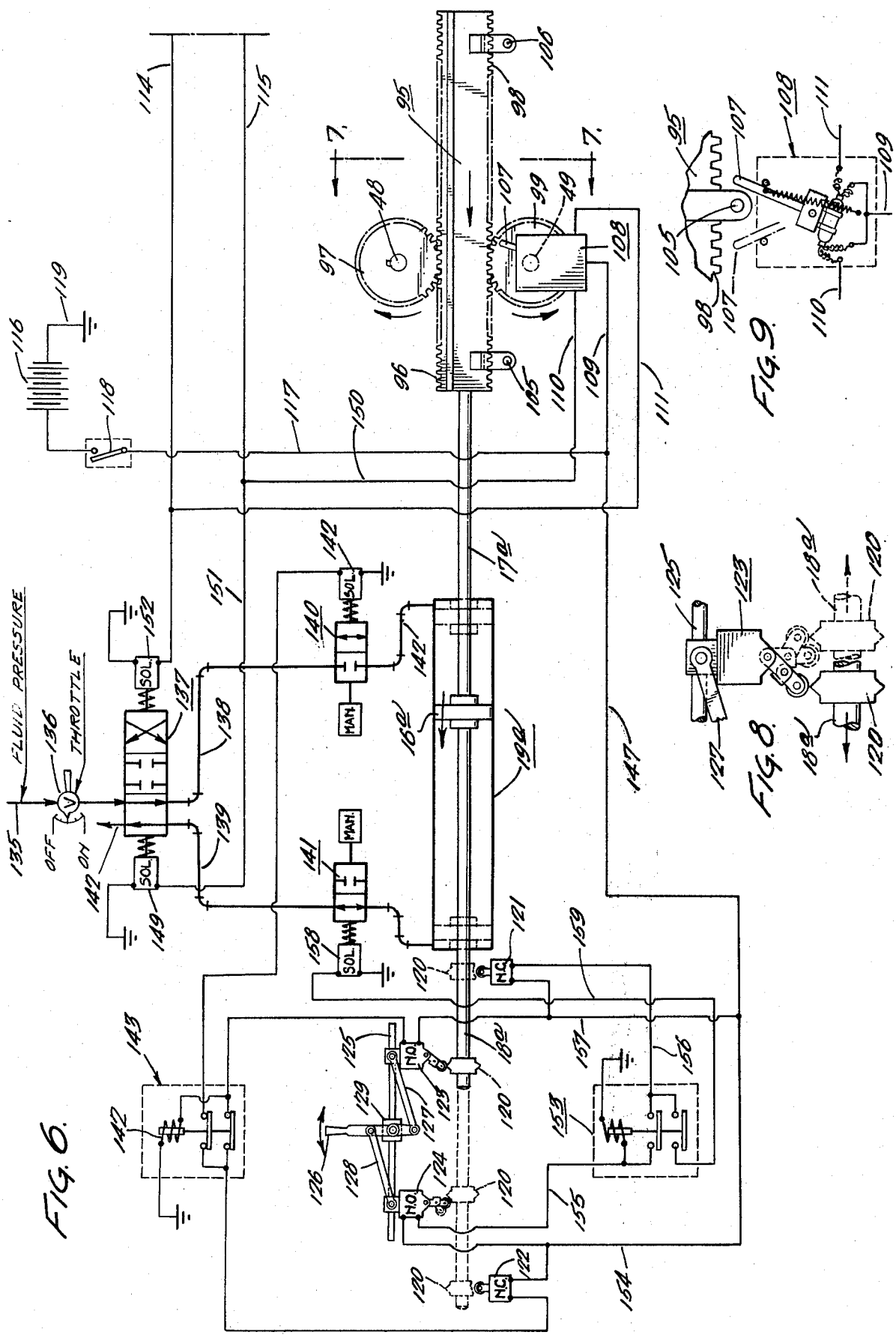

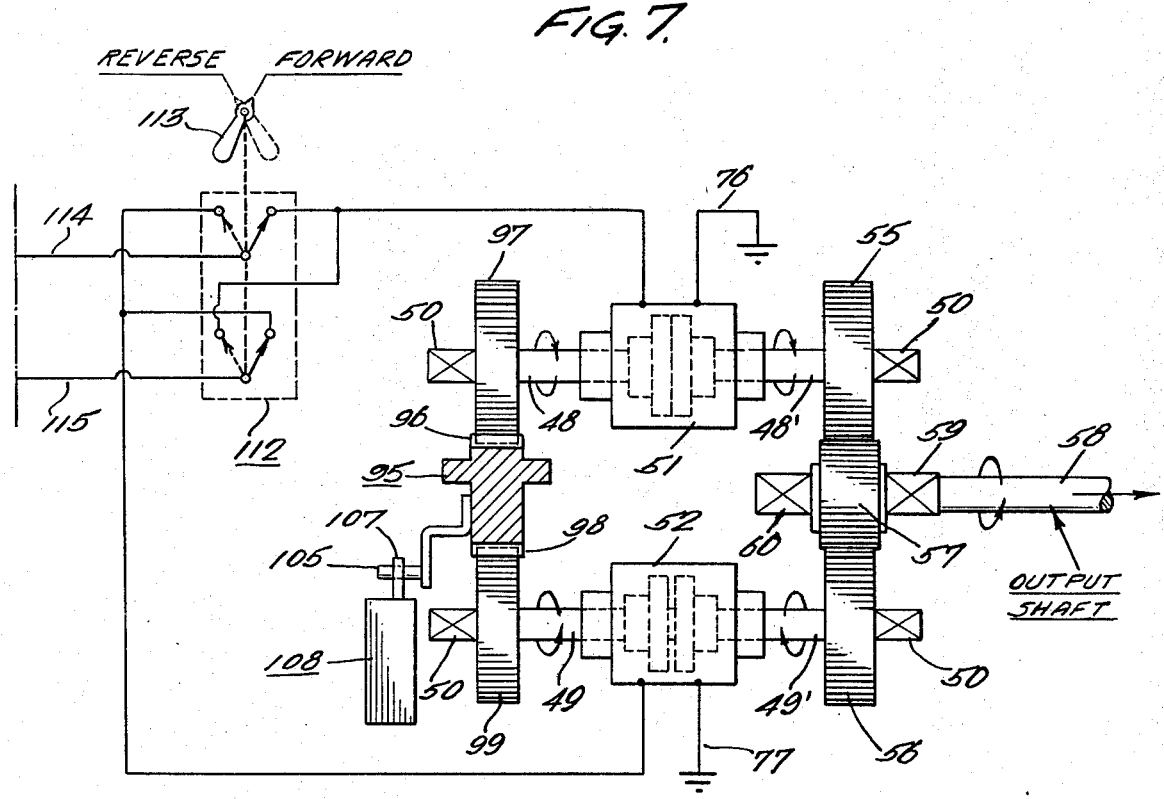
FIG. 7.
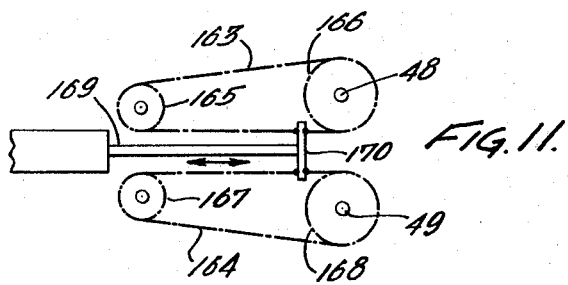
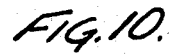
FIG. 10.
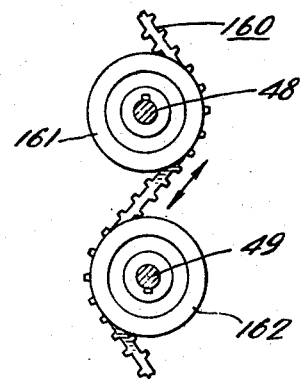
FIG. 11.
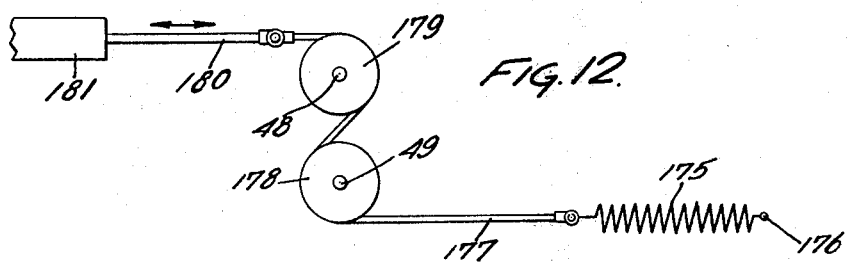
FIG. 12.
FIG. 13.
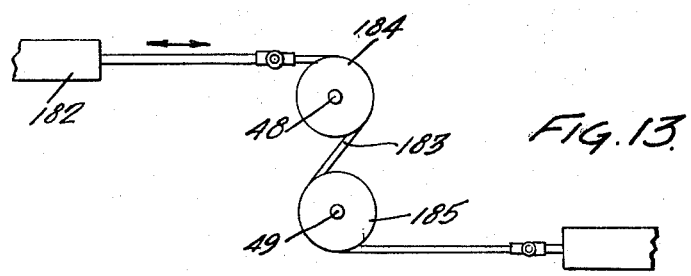

CONVERSION MECHANISM FOR LINEAR TO ROTARY MOTION

PRIOR ART AND BACKGROUND

Up to the present time, the known mechanisms for converting linear motion to rotary motion have had one or more serious disadvantages. Examples of such devices are a ratchet and pawl movement, wobble plate, walking beam, Scotch yoke and the most common being a shaft having offset crank throws with connecting rods pivoted directly to a piston or to a crosshead. Most of these have inherent variable thrust in one revolution due to angularity of the connecting rod or its equivalent part. The thrust or torque actually imparted to the driven shaft follows a sine curve of harmonic motion for each piston that is connected to the crankshaft.

In addition to the sine curve representing transmitted torque from the piston to the crankshaft due to the angularity of the connecting mechanism, there is the sinusoidal shape of the piston speed curve. The expander described herein has a reciprocating piston so that no torque is transmitted at the point of piston travel reversal, but the compensation for this characteristic is well known and may take the form of a flywheel and/or multi cylinders arranged at 45°, 60°, 90° or 180° to each other.

The present invention does, however, eliminate all thrust variation by completely eliminating the angularity of the connecting means between the piston and the shaft. Vector resolution of the force dependent upon angularity is therefore unnecessary.

While history reveals that the reaction turbine may have been the first prime mover completely independent of natural forces, the piston type expander has inherent advantages not present in the turbine which is a constant load, constant speed power source. The external combustion power plant utilizing a Rankine, Cornish, Carnot or Clausius cycle has a tremendous advantage in that it produces maximum torque at zero speed. In addition, it is fundamentally a variable speed prime mover adapted especially to the wide range of power and speed requirements of the modern land vehicle whether used on rails, roads or off the highway. Furthermore, the ability of the external combustion power plant to use nearly any type of fuel to generate the elevated vapor (steam)pressure ranges from sawdust to nuclear fission. The internal combustion motor is limited to a relatively small and dwindling supply of petroleum extract or a gas which must be produced on the vehicle.

OBJECTS OF THE INVENTION

The present invention provides a distinct advance in the art in that it achieves an effective means for utilizing and converting linear motion to rotary motion. It is a further object of the invention to provide an improved means for connecting oppositely rotating elements intermittently to a single rotating shaft or element by means of the timed actuation of clutches. It is a further object of the invention to provide a variety of relatively simple means for simultaneously rotating two members in opposite directions, such as by a rack, a chain and sprockets or belt. It is a further object of the invention to provide both double and single acting vapor engines for rotating the circular members. A further object of the invention is to provide improved control means for a vapor type expander. A further object of the invention is to provide improved reversing means for a vapor type expander and a further object is to provide improved electrical control means for a vapor type expander.

IN THE DRAWINGS,

FIG. 1 is a view showing the preferred form of a double acting vapor expander driving two sprockets through a chain, FIG. 2 is a 90° view showing the driven shafts of FIG. 1 connected to the output shaft through electrically operated clutches, FIG. 3 is a detail of the cut-off control of FIG. 1 in a moved position, FIG. 4 is a section as seen at 4—4 of FIG. 1, FIG. 5 is a section as seen at 5—5 of FIG. 2, FIG. 6 is a schematic diagram of a modified form for actuating the oppositely turning shafts by a reciprocating rack and electrical controls for the valve motion and the cut-off, FIG. 7 is a view as seen at 7—7 of FIG. 6, FIG. 8 is an enlarged detail of one of the cut-off control switches shown in FIG. 6, FIG. 9 is an enlarged detail of one of the valve actuating switches of FIG. 6, FIG. 10 shows a modification using a cog belt instead of the roller chain of FIG. 1, FIG. 11 shows a further modification using a pair of belts or chains connected to the crosshead of a double acting vapor expander, FIG. 12 shows a single acting vapor expander actuating two oppositely rotating members in which a return element such as a spring is utilized, FIG. 13 is a multi-cylinder version of FIG. 12 in which two single acting cylinders are used at opposite ends of the driving belt.

Referring now more particularly to the drawings,

It will be understood that as used herein "vapor" includes any pressurized gaseous medium and specifically steam, whether wet or superheated. The term expander refers to any device in which the pressure of the vapor moves a piston in a cylinder in a linear direction. The expander may be a Stirling type engine, compressed air engine, or Brayton engine. However, it is adapted to slower speeds than are generally the practice with the internal combustion engine.

The simplified and schematic valve gear shown in FIG. 1 is illustrative of any known form capable for use with the invention.

For example, the rotary type such as Corliss; link type such as Stephenson, Allen or Gooch; radial type such as Hackworth, Marshall or Walschaerts and the Stevens or Lentz may be mentioned.

The valves themselves are not illustrated since the form of valve is not part of the present invention but well known forms such as D slide valve, piston valve, gridiron valve, poppet valve, Corliss valve are all applicable.

Referring now to FIG. 1 a schematically illustrated expander has a cylinder 15 enclosing a reciprocating piston 16 operating two piston rods 17 and 18 through cylinder heads 19, 20 and stuffing boxes 21 and 22. The showing of FIG. 1 discloses a double acting expander or engine in which the steam or vapor is introduced to the cylinder through the inlet conduit 25 and expelled through the exhaust 26. The valves which may be of any desirable type as enumerated above are contained in the schematically illustrated steam chest 27. The valve gear is actuated through a shaft 28 connected to one of the piston rods such as 18 through a cut-off control mechanism 29 to be described more fully hereinafter.

An arm 35 is securely connected to piston rod 17 at one end and carries a threaded yoke 36 secured in the arm 35 by means of a lock nut 37. A corresponding arm 38 is secured to piston rod 18 and carries its threaded yoke 39 secured by lock nut 40. Each end of a chain 41 is secured in yokes 36 and 39 as shown in FIG. 1. Chain 41 passes clockwise around sprocket 42 and counter clockwise around sprocket 43. A guide roller 44 maintains proper contact between chain 41 and sprocket 42 as does guide roller 45 with respect to the chain as it passes around sprocket 43. It will be seen that as the piston 16 reciprocates in cylinder 15 chain 41 likewise has a linear movement but turns sprockets 42 and 43 in opposite directions. These sprockets are keyed to shafts 48 and 49 which are journaled suitably in bearings 50, 50 (FIG. 2). Shaft 48 is selectively connected to shaft 48' through a magnetic clutch 51 and shaft 49 likewise is selectively connected to shaft 49' through a magnetic clutch 52. In FIG. 2 clutch 51 is engaged whereas clutch 52 is disengaged. Shafts 48' and 49' are drivingly interconnected by means of a gear 55 keyed to shaft 48' and gear 56 keyed to shaft 49', both gears 55 and 56 mesh with gear 57 keyed to output shaft 58 journaled at 59 and 60.

Referring now to FIG. 1, clutches 51 and 52 are alternately engaged and disengaged at the end of a piston stroke by means of an electrical circuit actuated through rocker arms 65 and 66 tied to each other by means of a link 67. A pin 68 on yoke 38 serves to trip the rocker arms 65 and 66 at each end of the piston stroke. A suitable mercury switch 69 shown in detail in FIG. 9 selectively connects battery 70 to lines 71 and 72. Battery 70 is provided with a manually operated switch 73 in line 70a and is grounded at 70b.

Referring now to FIG. 2, lines 71 and 72 are connected to the reversing mechanism or switch 74 which can be manually controlled by means of lever 75. Actuation of lever 75 simply reverses the connections between lines 71, 72 and lines 71a and 72a. Line 72a is connected to clutch 51 which is in turn grounded at 76, whereas line 71a connected to clutch 52 is grounded at 77.

In operation, it will be understood that unidirectional rotary motion is imparted to output shaft 58 on each stroke of the piston by selectively connecting and disconnecting shafts 48' and 49' to their driving shafts 48 and 49 through clutches 51 and 52. In FIG. 2 shaft 48 is driving shaft 58 through clutch 51, shaft 48', gears 55 and 57 in the direction shown by the arrows. Shaft 49' during this portion of the cycle is, of course, turning in the opposite direction from shaft 48' but is disconnected from shaft 49 by the disengagement of clutch 52. The arrow on shaft 49 shows that it turns in the opposite direction from shaft 48 during this portion of the cycle. When piston 16 reaches the end of its stroke or travel, arm 66 is pivoted to reverse the connections between lines 71a and 72a thus engaging clutch 52 and disengaging clutch 51 so that shaft 49 driven by sprocket 43 now turns in the opposite direction, but nevertheless drives shaft 58 in the same direction. The means for reversing the direction of shaft 58 involves merely the actuation of switch 74 which reverses the engagement and disengagement of clutches 51 and 52 with respect to the stroke of piston 16. In the description of the actuation of clutches 51 and 52, it is preferred to actuate these through electrical means. However, it will be understood that a mechanical actuation of clutches 51 and 52 is entirely possible should the particular form of expander indicate its desirability.

Referring now to FIG. 3, the expander suitable for use in the present invention will ordinarily require means for varying the cut-off which is to say the point at which vapor admission to the cylinder on the expansion stroke is closed. It is extremely wasteful of power and efficiency to operate an engine of this type at full admission, that is, when the vapor admitted to the cylinder carries the piston approximately the full length of its stroke. In a steam engine, optimum results are ordinarily obtained with 25% to 40% cut-off. Therefore, in order to illustrate schematically a suitable means for varying the cut-off in which a link or other motion (such as the Stephenson) connected to the crankshaft is not practical, a stationary bracket 80 (FIG. 3) is conveniently mounted on any fixed portion of the expander or its frame. The bracket 80 carries a block 81 slidable in ways 82, 82 of the bracket 80. The sliding position of block 81 is controlled manually by means of a lever 83 pivoted at 84 and having a sector 85 engaging with a rack 86 on the side of block 81. Movement of lever 83 controls the position of block 81 in housing 80. Block 81 carries a pivot 87 on which is journaled a bearing 88 movable in slot 89 of link 90. The upper end of link 90 is journaled to shaft 28 by means of a ball and socket connection 91 which permits turning motion but no linear motion with respect to the shaft. The opposite end of link 90 is pivotly connected to arm 38 by means of link 92. It will thus be understood that when the piston rod 18 reciprocates, link 90 pivots on pin 87 to reciprocate valve shaft 28 and the relative amount of reciprocation between shafts 28 and 18 is dependent upon the relative distance between pivot pin 87 and the two shafts as controlled by lever 83. FIG. 3 illustrates the manner in which link 90 pivots on pin 87 to effect movement of the valve shaft 28.

A modified form of the invention is shown in FIG. 6 in which the control system is completely electrical rather than semielectrical, as shown in FIGS. 1 and 2.

Referring now to FIG. 6, the cylinder 19a of the expander carries a piston 16a, both of which may be the same as the showing of the cylinder and piston of FIG. 1. In this form, however, one of the piston rods 17a is connected to a double rack 95 in which the upper rack 96 engages the teeth on a gear 97 keyed to shaft 48 (FIG. 7), and in which the lower rack 98 engages teeth on gear 99 keyed to shaft 49. It will be understood that gears 97 and 99 in FIG. 7 replace the sprockets 42 and 43 in FIG. 1 and that the remainder of the showing of FIG. 7 duplicates that of FIG. 2 and, therefore, the same reference numerals are used. As piston 16a reciprocates in cylinder 19a, gears 97 and 99 turn shafts 48 and 49 in opposite directions for each stroke of the piston. At one end of rack 95, a trip 105 is adjustably positioned and trip 106 is also adjustably positioned at the other end of rack 95. These trips alternately pivot arm 107 of the switch 108 similar to switch 69 which alternately connects line 109 to lines 110 and 111. The actuation of switch 108 performs the same function as switch 69 in FIG. 1 by timing the engagement and the disengagement of clutches 51 and 52 through a reverse switch 112 having a manual control 113 and operating the same as switch 74 in FIG. 2.

The reverse switch 112 is connected to lines 110 and 111 through lines 114 and 115 and line 109 is connected to battery 116 through line 117, switch 118 and thence to ground at 119.

Piston rod 18a extending through the opposite end of cylinder 19a carries a trip 120 which actuates two switches 121 and 122, both of which are normally closed. Two other normally open switches 123 and 124 are slidably mounted on a rod 125, each of the switches being connected to a lever 126 through links 127 and 128 respectively. Pivoting of the lever 126 on its fixed mount 129 moves switches 123 and 124 closer together or farther apart, thus controlling the points in travel of piston rod 18a where these switches are actuated by trip 120. The purpose of this manually controllable movement of switches 123 and 124 is to vary the cut-off as will be described more fully hereinafter.

Instead of the mechanical valve gear or motion shown schematically in FIG. 1, an electrical control system for the valves is shown in FIG. 6. Pressurized vapor is admitted from the vapor-generating source (not shown) through conduit 135 and any suitable throttle arrangement indicated schematically at 136. The vapor, such as water vapor or steam, then passes through a solenoid controlled valve 137 having suitable inlet and outlet ports. Conduit 135 can be alternately connected to steam conduits 138 and 139 by means of valve 137. As is common in steam engine practice, conduits 138 and 139 serve selectively for the inlet and exhaust of steam at opposite ends of the double acting cylinder 19a. In the position shown in FIG. 6, steam conduit 135 is connected to conduit 138 thereby admitting steam to the right-hand end of cylinder 19a through a solenoid valve 140. Likewise, steam conduit 139 is connected to the left-hand end of cylinder 19a through a solenoid controlled valve 141. As steam is admitted to the right-hand end of the cylinder, the left-hand end of the cylinder is connected to the exhaust conduit 142 through valves 141 and 137. It will be understood that as is common practice, this cycle reverses as the piston 16a reaches each end of its travel in the cylinder so that steam admitted behind the piston forces it to reciprocate therein and at the beginning of each piston travel, the opposite end of the cylinder is connected to the exhaust permitting the escape of the expanded steam.

In the showing of FIG. 6, piston 16a is traveling from right to left with the left-hand end of cylinder 19a exhausting through valves 141 and 137. However, valve 140 has just been actuated to cut-off steam admission at approximately 25% of the stroke. This cut-off is accomplished when the trip 120 closes normally open switch 123. This completes a circuit to solenoid 142 of valve 140 through the actuation of relay 143 which closes contacts 144 closing the circuit to solenoid 142 through line 145 and lines 146, 147 and 117. It will be noted that the roller contacts of switches 123 and 124 each has a knee action arm 148 (FIG. 8) which permit only one way actuation of the switches. When the trip 120 moves from right to left in FIG. 8 the switch is actuated because the pivot on the arm 148 of the switch remains rigid whereas when the trip 120 moves from left to right only the lower section of arm 148 swings to prevent actuation of the switch. The same knee action control is used for switch 124 except that it is reversed so that switch 124 is closed only when trip moves from left to right.

As the piston 16a continues to travel from right to left under actuation of the pressure of the steam in the right-hand end of cylinder 19a, trip 120 will pass through the arm of switch 124 without actuating the switch but at the end of its stroke will open normally closed switch 122. Opening of this switch breaks the holding circuit for relay 143, thus de-energizing solenoid 142 to connect conduits 138 and 142 with the right-hand end of cylinder 19a. This occurs at the same time that valve 137 is reversed as the trip 106 reverses switch 108 thereby admitting steam to conduit 139 and connecting conduit 138 to the exhaust 142. It will be seen that this reversal of valve 137 is effected when the circuit to solenoid 149 is closed through lines 117, 109, switch 108, lines 150 and 151. Actuation of switch 108 simultaneously open the energizing circuit to solenoid 152 of valve 137. Piston 16a then reverses its direction in cylinder 19a to travel from left to right. However, cut-off on this stroke is accomplished when trip 120 moves the arm on normally open switch 124 to close the circuit through the coil of relay 153 through lines 147, 117, 154 and 155. Contacts of relay 153 are held in the closed position by a holding circuit through lines 156, switch 121, lines 157, 147 and 117. In addition, solenoid 158 is energized through the lower contacts of relay 153, lines 156, switch 121, lines 157, 147, 117 and 159. This effects the desired cut-off on the return stroke and the amount of cut-off can be controlled by moving lever 126 to the proper position. As piston 16a continues its travel from left to right, trip 120 passes through the knee action arm on switch 123 without closing this switch. When trip 120 reaches switch 121 the holding circuit for relay 153 is opened. It will be understood that this actuation of solenoid valves 137, 140 and 141 is repeated at the opposite end of the stroke and continues sequentially in this fashion as the piston reciprocates in the cylinder. The control of the clutches 51 and 52 (FIG. 7) proceeds as described in connection with FIG. 1 through the operation of switch 108. Reversal of the direction of rotation of shaft 58 is accomplished in the same manner as described previously by operation of switch 113 to reverse the contacts in switch 112.

Instead of the chain and sprocket drive shown in FIG. 1 or the rack and pinion drive of FIG. 6 for driving shafts 48 and 49, it is also possible to employ other means, some of which are illustrated in FIGS. 10–13. In FIG. 10, I use a flexible belt 160 having teeth on opposite sides which is trained clockwise around pulley 161 and counter clockwise around pulley 162. In FIG. 11, I employ two endless belts 163 and 164 running around pulleys 165, 166 and pulleys 167, 168 which replace the gears 55 and 56. The piston rod 169 is rigidly connected to each belt 163 and 164 at 170. FIG. 12 shows a variation in which a spring 175 is anchored at 176 and connected to one end of the belt or chain 177 which passes in opposite directions over pulleys 178 and 179 and is then connected to the piston rod 180 for a single acting cylinder 181. FIG. 13 utilizes more than one cylinder so that cylinder 182 is connected to one end of a belt or chain 183 passing in opposite directions over pulleys or sprockets 184, 185 and connected to a second cylinder 186. Cylinders 182 and 186 may be either single acting or double acting, as desired.

The invention described herein utilizes oppositely turning rotation of two interconnected shafts to transmit unidirectional rotation to an output shaft through disconnecting means in the shafts of the oppositely rotating members. The prime mover utilized to transmit the oppositely rotating motion may take any known form. However, the linear motion of the prime mover is converted to rotary motion by many convenient means, such as a rack, chain or belt which simultaneously drives at least two shafts in opposite directions.

Having this described my invention, I claim:

1. Mechanism for converting linear motion to unidirectional rotary motion comprising a first shaft reciprocating in a linear path, pressure responsive means for moving said first shaft, a second shaft journaled to rotate on its axis, a third shaft journaled to rotate on its axis, connecting means between said first shaft and each of the second and third shafts, said connecting means adapted to turn the second and third shafts in opposite directions on each linear reciprocation of the first shaft, a single output shaft drivingly connected to each of said rotating second and third shafts, and means in each of said rotating shafts for selectively engaging and disengaging said rotary shafts to said output shaft whereby the output shaft turns in the same direction upon reciprocation of the first shaft.

2. Apparatus in accordance with claim 1 in which the connecting means comprises a flexible element passing in opposite directions around the second shaft and third shafts.

3. Apparatus in accordance with claim 1 in which the connecting means between the first shaft passes clockwise around a sprocket connected to the second shaft and counter clockwise around a sprocket connected to the third shaft.

4. Apparatus in accordance with claim 1 in which the connecting means comprises a double reciprocating rack.

5. Apparatus in accordance with claim 1, in which the means for selectively engaging and disengaging said rotary shafts is electrically operated.

6. Apparatus in accordance with claim 5 including a reversing switch in the circuit for the engaging and disengaging means.

7. A vapor expander having a cylinder, a piston reciprocating linearly in said cylinder, a piston rod connected to said piston and extending through at least one cylinder head, a first shaft journaled on its axis for rotary motion, a second shaft journaled on its axis for rotary motion, connecting means between said piston rod and said first and second shafts whereby said first and second shafts rotate in opposite directions on their axes for each reciprocation of the piston rod, a third output shaft journaled to rotate on its axis, means selectively connecting said third output shaft to each of said first and second shafts whereby the output shaft maintains unidirectional rotary motion on each reciprocation of the piston rod.

8. A vapor expander having a cylinder, a piston reciprocating linearly in said cylinder, a piston rod connected to said piston and extending through at least one cylinder head, a first shaft journaled on its axis for rotary motion, a second shaft journaled on its axis for rotary motion, connecting means between said piston rod and said first and second shafts whereby said first and second shafts rotate in opposite directions on their axes for each reciprocation, a third output shaft journaled to rotate on its axis, electric clutch means in each of said rotating shafts for selectively engaging and disengaging said first and second rotary shafts to said third output shaft whereby the output shaft turns in the same direction upon reciprocation of the first shaft.

9. Apparatus in accordance with claim 8 including valve means for admitting and exhausting vapor into and out of said cylinder, an electrical circuit for actuating said valve means, and trip means actuated by the piston rod for opening and closing said circuit in timed relation to the movement of the piston rod.

10. Apparatus in accordance with claim 9 including at least one adjustable switch in said circuit for closing the admission valve to obtain a predetermined cut off for vapor admission.

* * * * *